(12) United States Patent
Kessler (10) Patent No.: US 6,191,802 B1
(45) Date of Patent: Feb. 20, 2001

(54) OPTICAL APPARATUS AND METHOD FOR INCREASING INTENSITY OF MULTIMODE LASER BEAMS AND A PRINTER FOR PRINTING LENTICULAR IMAGES UTILIZING SUCH LASER BEAMS

(75) Inventor: David Kessler, Rochester, NY (US)

(73) Assignee: Eastman Kodak Company, Rochester, NY (US)

( * ) Notice: Under 35 U.S.C. 154(b), the term of this patent shall be extended for 0 days.

(21) Appl. No.: 09/175,735

(22) Filed: Oct. 20, 1998

(51) Int. Cl.[7] .......................................................... B41J 2/47
(52) U.S. Cl. ............................................. 347/225; 347/259
(58) Field of Search .................................... 347/241, 112, 347/244, 225, 243, 233, 259, 232; 359/619, 628, 210, 483, 662, 250, 276, 278, 279, 301, 302, 494, 495, 496, 497; 369/110, 112, 116; 350/469

(56) References Cited

U.S. PATENT DOCUMENTS

| 4,756,583 | * | 7/1988 | Morimoto | 350/469 |
|---|---|---|---|---|
| 5,349,419 | | 9/1994 | Taguchi et al. | 355/22 |
| 5,533,152 | * | 7/1996 | Kessler | 359/495 |
| 5,633,736 | * | 5/1997 | Griffith et al. | 359/662 |
| 5,696,596 | * | 12/1997 | Taniguchi | 347/112 |
| 5,781,323 | * | 7/1998 | Takada et al. | 347/259 |
| 5,808,657 | * | 9/1998 | Kurtz et al. | 347/244 |

FOREIGN PATENT DOCUMENTS

| 364 549 | 10/1981 | (DE) . |
|---|---|---|
| 0 560 180 | 9/1993 | (EP) . |
| 0 566 125 | 10/1993 | (EP) . |
| 0 867 991 | 9/1998 | (EP) . |
| 42-5473 | 3/1967 | (JP) . |
| 48-6488 | 2/1973 | (JP) . |
| 49-607 | 1/1974 | (JP) . |
| 53-33847 | 9/1978 | (JP) . |
| 59-3781 | 1/1984 | (JP) . |

OTHER PUBLICATIONS

European Search Report EP 99 20 3281, Jul. 19, 2000.
Annex to the European Search Report on European Patent Application No. EP 99 20 3281, Jul. 19, 2000.

* cited by examiner

Primary Examiner—N. Le
Assistant Examiner—K. Feggins
(74) Attorney, Agent, or Firm—Svetlana Z. Short; William R. Zimmerli (57) ABSTRACT

According to one aspect of the present invention a method for increasing intensity of a polarized multimode laser beam including the steps of: (i) changing polarization of a portion of a cross section of the multimode laser beam, so that the cross section of this multimode laser beam comprises a first portion with one polarization and a second portion with a polarization that is different from this one polarization; and (ii) at least partially superimposing the first portion of the cross section of the multimode laser beam onto the second portion of the cross section of the multimode laser beam, thereby forming a superimposed laser beam. According to another aspect of the present invention an optical apparatus includes: (i) a multimode laser adapted to provide a multi-mode laser beam along a path; (ii) at least one polarization changing component partially intercepting the path to change polarization of laser light intercepted by this component, so that a multimode laser beam provided along the path has a cross section with two portions of differing polarization; and (iii) a polarization combiner overlapping the two portions of the multimode laser beam, thereby forming a concentrated laser beam.

34 Claims, 10 Drawing Sheets

OPTICAL APPARATUS AND METHOD FOR INCREASING INTENSITY OF MULTIMODE LASER BEAMS AND A PRINTER FOR PRINTING LENTICULAR IMAGES UTILIZING SUCH LASER BEAMS

CROSS-REFERENCE TO RELATED APPLICATIONS

Cross-reference is made to commonly assigned copending U.S. Applications:

U.S. Ser. No. 09/128,077, filed Aug. 3, 1998, entitled "Printing Lenticular Images" by David Kessler et al; U.S. Ser. No. 09/128,521, filed Aug. 3, 1998, entitled "Flying Spot Laser Printer Apparatus and A Method of Printing Suitable for Printing Lenticular Images" by David Kessler et al; U.S. Ser. No. 08/961,057, filed Oct. 30, 1997, entitled "A Method for Printing Interdigitated Images" by Lee W. Tutt; and U.S. Ser. No. 08/828,637, filed Mar. 31, 1997, entitled "Apparatus and Method for Aligning and Printing Multiple Images" by Roger A. Morton.

FIELD OF THE INVENTION

The present invention relates in general to an optical system used in concentrating a multimode laser beam intensity by changing polarization of a portion of the multimode laser beam and by folding this portion onto another portion and, in particular, to printing lenticular images using a printer that utilizes such concentrated laser beams.

BACKGROUND OF THE INVENTION

Lenticular sheets are used to give images an appearance of depth. More specifically, a lenticular sheet comprises a transparent upper layer A having narrow, parallel lenticulas (semi-cylindrical lenses) B on an outer surface, and an image-containing substrate layer C which projects images through the lenticulas. (See FIG. 1A). The two layers of a lenticular sheet provide an image such that different portions of the image are selectively visible as a function of the angle from which the lenticular sheet is viewed. If the image is a composite picture made by bringing together into a single composition a number of different parts of a scene photographed from different angles, and the lenticulas are vertically oriented, each eye of a viewer will see different elements and the viewer will interpret the net result as a three dimensional (3-D) image. The viewer may also move his head with respect to the lenticular sheet thereby observing other views with each eye and enhancing the sense of depth.

Another method for showing 3-D images is the use of a blocking line screen positioned at a specific distance from the composite picture. This process, known as a parallax process, causes blocking of all images except one specific image. This allows the eyes to view different images as three-dimensional (3-D) images, when the blocking line screen is oriented vertically.

When the lenticulas or the blocking line screen is oriented horizontally, each eye receives the same image. In this case, the multiple images give illusion of motion when the composite image is rotated about a line parallel to the viewer's eyes. Thus, a simulation of motion is achieved by the process of tipping the lenticular sheet or the blocking line screen, or by movement of the viewer's head to a different angle with respect to the lenticular sheet.

Whether the lenticulas or the blocking line screen is oriented vertically or horizontally, each of the viewed images is generated by lines of images (also referred to as image lines) which have been interlaced at the spatial frequency of the lenticulas or the blocking line screen. Interlacing lines of each image with other images is referred to as interdigitation. A full set of such interdigitated image lines forms a lenticular image. Interdigitation can be better understood by using an example of four images used to form a composite image with a lenticular sheet that has three lenticulas. In this example, line 1 from each of the four images is in registration with the first lenticula; line 2 from each of the four images is in registration with the second lenticula; etc. Each lenticula is associated with a plurality of image lines D or an image line set (See FIG. 1A), and the viewer sees only one image line of each set with each eye for each lenticula. It is imperative that the image line sets be registered accurately with respect to the lenticulas, so that the proper picture is formed when the assembly is viewed.

One method of conventional recording of the interdigitated image lines requires recording of the interdigitated image lines on a recording material contained on the substrate layer C and then attaching the substrate layer C to the upper layer A, with the recorded image lines D in precise alignment to the lenticulas B to yield the desired image structure. The precise alignment of the specific lenticulas with the desired image line set during the attachment of the recording material to the lenticular overlay is difficult to achieve. This results in a degraded image quality.

Conventional recording of lenticular images has been accomplished with a stereoscopic image recording apparatus that uses optical exposure. A light source, such as a halogen lamp, is projected through an original image, via a projection lens, and focused on the substrate layer of the lenticular sheet. The lenticular images are exposed on a recording material as interdigitated image lines. Japanese (Kokoku) Patent Applications Nos. 42-5473, 48-6488, 49-607, and 53-33847 disclose recording apparatus in which two original images are projected for printing on a lenticular recording material. Recording lenticular images in this fashion (i) requires complex projection lens systems, which are expensive, and (ii) does not work well with thermal dye transfer approaches because it requires more power than what is produced by a halogen lamp or a similar light source.

In contrast, image recording by scanning (linear) exposure requires comparatively simple optics, yet has great flexibility in adapting to various image processing operations, and to alterations in the dimension of the lenticulas. To take advantage of these features, various apparatus and methods have been proposed for recording an image by scanning exposure. For example, Japanese (Kokoku) Patent Application No. 59-3781 teaches a stereoscopic image recording system in which a plurality of original images is taken with a TV camera, processed and stored in frame memories from which the stored image signals are retrieved sequentially as image lines in accordance with the pitch of lenticulas used. After the image lines are recorded on a substrate layer by scanning exposure, the upper layer of the lenticular sheet is bonded to the substrate layer containing the image lines. Another image recording system uses polygon scanners, described in U.S. Pat. No. 5,349,419, for exposure of stereoscopic images directly on photosensitive back surface of a lenticular sheet.

It is desirable to write interdigitated images directly on a back surface of lenticular sheet using thermal dye transfer. This would eliminate the need for careful alignment of specific pre-printed image lines of the substrate layer with the specific lenticulas of the upper layer of the lenticular sheet. The use of thermal dye transfer to write such interdigitated images requires, however, large amounts of energy. Such energy can be provided by high power lasers.

Furthermore, high quality lenticular images require that a large number of images be placed behind a fine pitched lenticular sheet. For example, in order to produce 25 images with a lenticular sheet of 100 lenticulas per inch one needs to produce 2500 lines per inch of continuous tone spots. This means a pixel size of approximately 10 microns or less. To expose such a small pixel, the beam size has to be approximately of the same size as the pixel size. A single mode laser can easily provide such a small beam size. Therefore, a single mode laser, may be used to write interdigitated images. Unfortunately, high power, inexpensive single mode diode lasers are not available.

Inexpensive high power multimode lasers are commercially available. However, such lasers have two major problems. Firstly, they have an emitting aperture with a high aspect ratio and elliptical beam divergence. These characteristics make it hard to obtain a scanning spot with desired size and shape. Secondly, the emitting aperture size of the laser and hence the spot size at the recording material in any direction is inversely proportional to the amount of laser power in this direction. However, it is desired that a laser thermal printer has a high power density, i.e., that it has both the maximum power and the smallest possible spot size. Because a multimode laser produces a spot size that is long (large spot size in one dimension), the laser power is spread across the length of the spot, resulting in low power density.

SUMMARY OF THE INVENTION

It is an object of the present invention to provide an optical apparatus and a method for increasing the intensity of a multimode laser beam. Such laser beams may be used, for example, in a flying spot laser printer to print lenticular images.

According to one aspect of the present invention a method for increasing intensity of a polarized multimode laser beam including the steps of: (i) changing polarization of a portion of a cross section of the multimode laser beam, so that the cross section of this multimode laser beam comprises a first portion with one polarization and a second portion with a polarization that is different from this one polarization; and (ii) at least partially superimposing the first portion of the cross section of the multimode laser beam onto the second portion of the cross section of the multimode laser beam, thereby forming a superimposed laser beam.

According to another aspect of the present invention an optical apparatus includes: (i) a multimode laser adapted to provide a multimode laser beam along a path; (ii) at least one polarization changing component partially intercepting the path to change polarization of laser light intercepted by this component, so that a multimode laser beam provided along the path has a cross section with two portions of differing polarization; and (iii) a polarization combiner overlapping the two portions of the multimode laser beam, thereby forming a concentrated laser beam.

According to one embodiment of the present invention a method for printing images with a printer that has a scanner and utilizes a plurality of polarized multimode laser beams, each of which beams is provided by an emitting aperture of one of a plurality of multimode lasers, comprises the steps of: (i) modulating each of the multimode laser beams; (ii) changing polarization of a portion of a cross section of each of the plurality of multimode laser beams, so that each of the plurality of multimode laser beams comprises a first cross section portion with one polarization and a second cross section portion with a polarization that is different from the one polarization; (iii) directing the plurality of multimode laser beams toward a single beam deflector, such that the plurality of multimode laser beams are at least partially overlapping at the single beam deflector; and (iv) at least partially superimposing the first portion onto the second portion, for each of the plurality of multimode laser beams, thereby forming a plurality of superimposed laser beams. The plurality of superimposed laser beams are scanned across a recording material so that a scan direction corresponds to a long dimension of the emitting apertures. The recording material is translated in a cross scan direction that is perpendicular to the scan direction.

Also according to an embodiment of the present invention an optical apparatus includes: (i) a plurality of individually modulated multimode lasers, each of the multimode lasers having an elongated emitting aperture capable of providing a multimode at least one polarization changing component laser beam along a path; (ii) at least one polarization changing component partially intercepting each of the paths to change polarization of laser light intercepted by the component, so that each of the multimode laser beams provided along said path has two portions of differing polarization; (iii) a scanner adapted to deflect incident laser beams; (iv) imaging optics forming an image of the emitting apertures at the scanner, in at least one cross section; and (v) a polarization combiner located proximate to the scanner. The polarization combiner overlaps the two portions of each of the multimode laser beams, thereby forming a plurality of concentrated laser beam.

The above, and other objects, advantages and novel features of the present invention will become more apparent from the accompanying detailed description thereof when considered in conjunction with the following drawings.

BRIEF DESCRIPTION OF THE DRAWINGS

FIG. 2A is a schematic view of the emitting aperture and the emitted light of a typical multimode laser.

FIGS. 2B and 2C illustrate a laser beam cone emitted from the emitting aperture of a diode laser. FIG. 2B corresponds to a short dimension of the emitting aperture. FIG. 2C corresponds to a long dimension of the emitting aperture.

DETAILED DESCRIPTION OF THE EMBODIMENTS

The present description will be directed in particular to elements forming part of, or in cooperation more directly with, a printer apparatus in accordance with the present invention. It is understood that elements not specifically shown or described may take various forms well known to those skilled in the art.

Printer System

Figures 1A, 1B:
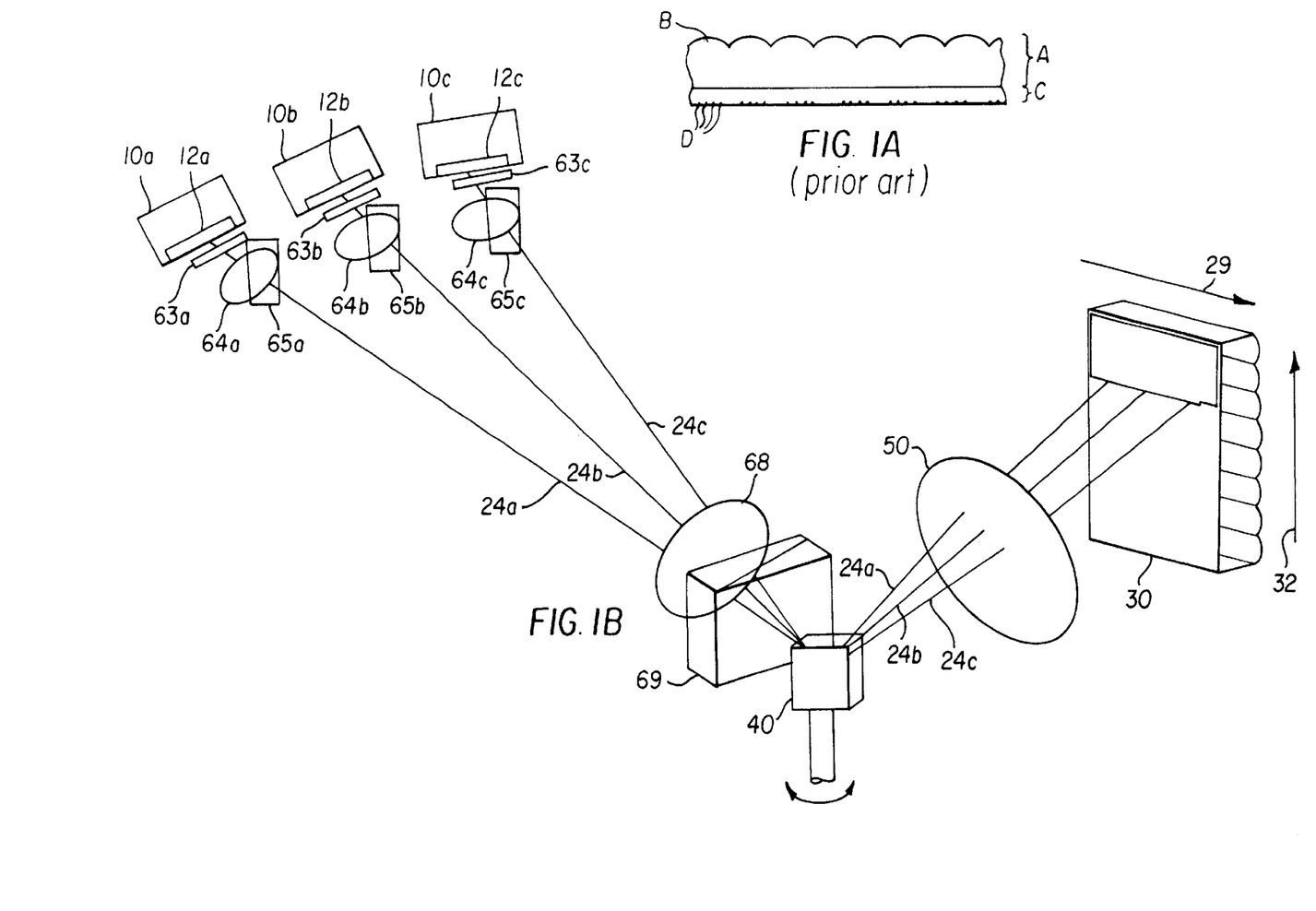
FIG. 1A illustrates a prior art lenticular sheet.
FIG. 1B is a schematic view of a first embodiment of a flying spot laser thermal printer utilizing several multimode diode lasers and a galvo mirror.

FIG. 1B shows the first embodiment of the present invention. In this embodiment the printer apparatus for writing interdigitated image lines on the backs of lenticular sheets comprises three lasers 10a, 10b and 10c and a scanner for scanning the laser beams provided by the lasers. Each of the lasers 10a, 10b, 10c is a multimode laser. Such multimode lasers have long and narrow emitting apertures 12a, 12b, 12c. In this embodiment the long dimension of the emitting apertures corresponds to the scan direction, which is depicted by a horizontal arrow. The short dimension of the emitting apertures corresponds to the cross scan direction, which is depicted by a vertical arrow. The properties of the multimode lasers and the laser beams provided by such lasers are described below.

Figures 2A, 2B:
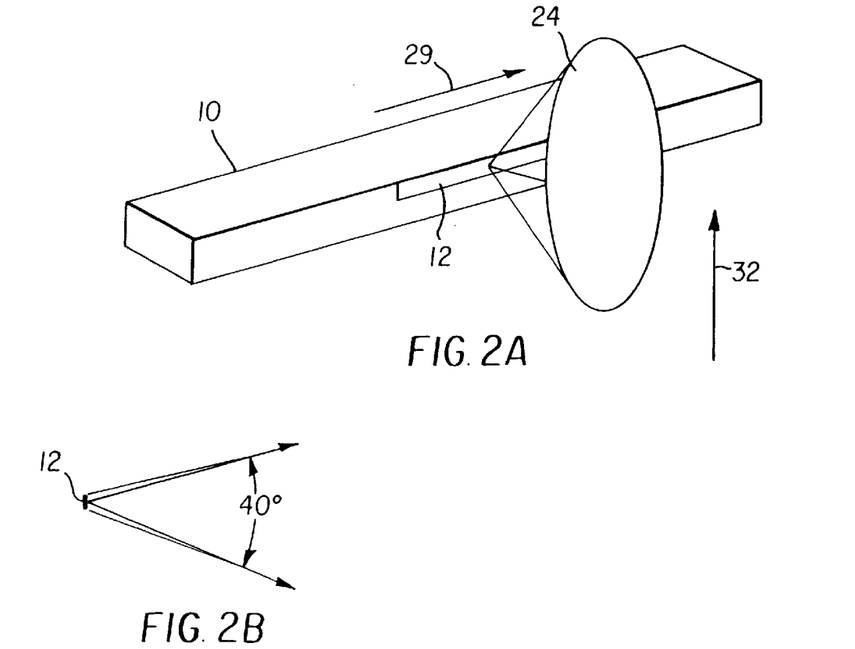
Figure 2C:
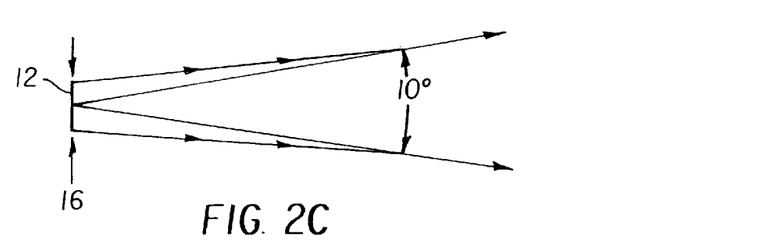
Figure 2D:
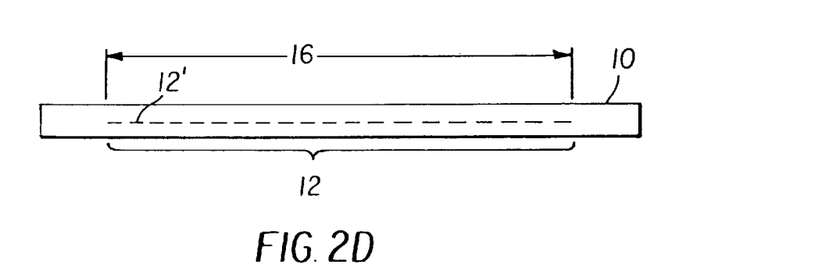
FIG. 2D illustrates schematically a laser with an emitting aperture comprising an array of small apertures.

FIG. 2A schematically illustrates an emitting aperture 12 of a typical 1 Watt multimode edge emitting diode laser 10. Such emitting apertures are typically $100\mu$ long and $1\mu$ wide. The narrow aperture is a direct result of the manufacturing process. Higher power lasers have longer emitting apertures. For example, a 2 Watt laser will typically have an emitting aperture dimension of $200\mu$ by $1\mu$. The laser light is usually produced at wavelengths of 700–900 nm. The laser light is typically emitted by the emitting aperture into a cone (as shown in FIG. 2A) of approximately 10° FWHM (Full Width Half Maximum) in by 40° FWHM. The smaller angle (10°) corresponds to the scan direction and the larger angle (40°) corresponds to the cross scan direction. FIGS. 2B and 2C schematically show a greatly enlarged aperture 12 and illustrate that a larger cone angle corresponds to a small aperture dimension and a smaller cone angle corresponds to a large aperture dimension. The long dimension of the emitting aperture 12 which is shown as a contiguous rectangular aperture on FIG. 2A can be made up as an array of small apertures 12' within the $100\mu$ by $1\mu$ area. (See FIG. 2D.)

The Lagrange value H of the laser beam is commonly defined as the product of half the beam size and half the divergence angle. The beam size is defined as half the length of the emitting aperture for a multimode laser and, as FWHM beam waist radius for a single mode laser. A single mode laser has Gaussian beam distribution in both spatial and angular dimensions and a Lagrange value of $H=0.35*\lambda/\pi$, where $\lambda$ is the wavelength of the laser beam. Therefore, for a wavelength of $0.83\mu$ the Lagrange value of a single mode laser is given by $$H=0.35*0.83/\pi=0.09\mu.$$

Typical multimode lasers are available from laser vendors such as Spectro Diode Labs, Inc. located in San Jose, Calif.; Polaroid Co. located in Waltham, Mass.; and Semiconductor Laser International Corp. located in Binghamton, N.Y. A multimode laser behaves like a single mode laser only in the direction perpendicular to the long dimension of the emitting aperture. Thus the Lagrange of the multimode laser in this (short) direction is about $0.09\mu$.

The divergence angle of the laser beam is defined by the numerical aperture of the laser beam. In the direction corresponding to the long dimension of the emitting aperture the Lagrange value of the laser beam from a typical 1 Watt multimode laser is given by the product of half the emitting aperture size (i.e., $100\mu/2$) and the numerical aperture (NA) of the laser beam in this direction. Because the numerical aperture NA of the laser beam in this direction is about 0.14, the Lagrange value is given by $$H=(50\mu)*(0.14)=7\mu.$$

This value is much larger than the Lagrange value for the single mode laser and thus we refer to the emission in this direction as multimode emission. It is well known that the number of resolvable spots of a flying spot laser printer along the scan line is inversely proportional to the Lagrange value of the scanning laser beam. This is why flying spot laser printers, invariably use single mode lasers which have the smallest Lagrange value. However, as mentioned above, high power single mode lasers are expensive.

According to one aspect of this invention, the printing of the lenticular images on the back surface of the lenticular sheet 18 is done with flying spot laser printer apparatus 20 in such manner that the fast scan direction corresponds to the direction of the long dimension of the emitting aperture(s) 12a, 12b, 12c. That is, the scanning spots 22a, 22b, 22c formed by the scanning laser beams 24a, 24b, 24c are larger in the fast scan direction than in the cross scan direction. Because of the large Lagrange value of the laser beams in this direction, the number of resolvable spots in this direction is considerably smaller than would have been possible with a single mode laser. However, for this application a total number of resolvable spots along the scan line of about 1000 per (3.5') scan line, is acceptable. This is about 286 DPI. In the cross scan direction the resolution for each viewed image is determined by the number of lenticulas 18a per inch, which limits the total number of resolvable spots for each viewed image to a couple of hundreds for an image size on the order a few inches. Because many image lines 25 respond to each lenticula, the image lines must be narrow and closely spaced, requiring higher resolution. It is preferred that the size of the scanning spots 22a, 22b, 22c the cross scan direction be about $15\mu$ or smaller. Larger spot sizes may also be used, but it reduces the resolution of the printed image.

Due to the unusual requirements of the lenticular images, namely, the need for a small spot only in the cross scan direction and the ability to tolerate a larger spot size in the fast scan direction, it is possible to utilize multimode diode lasers instead of more expensive single mode lasers.

As discussed above and shown in FIGS. 1B and 3, the multimode diode lasers 10a, 10b, 10c are oriented in such a way that the scan direction 29 of the laser beams corresponds to the long dimension of the emitting apertures 12a, 12b and 12c and to the long direction of the scanning spots 22a, 22b and 22c. (FIG. 1B depicts three multimode lasers. However, the number of multimode lasers utilized in a flying spot printer may be larger or smaller than 3). The scanning laser beams 24a, 24b and 24c produce narrow lines 25 with width of about 10μ or less on the recording material 30. The recording material 30 may be, for example, a back surface of a lenticular sheet and a thermally activated donor. Although thermal dye transfer method is preferred, actinically exposed material, such as silver halide, can also be used as a recording material 30 if visible light lasers are utilized. If an actinically exposed material is being used, a thermal donor is not needed.

During the scanning action the lasers 10a, 10b and 10c are being current modulated according to the image data to properly modulate the intensity of the laser beams 24a, 24b and 24c.

Figure 3:
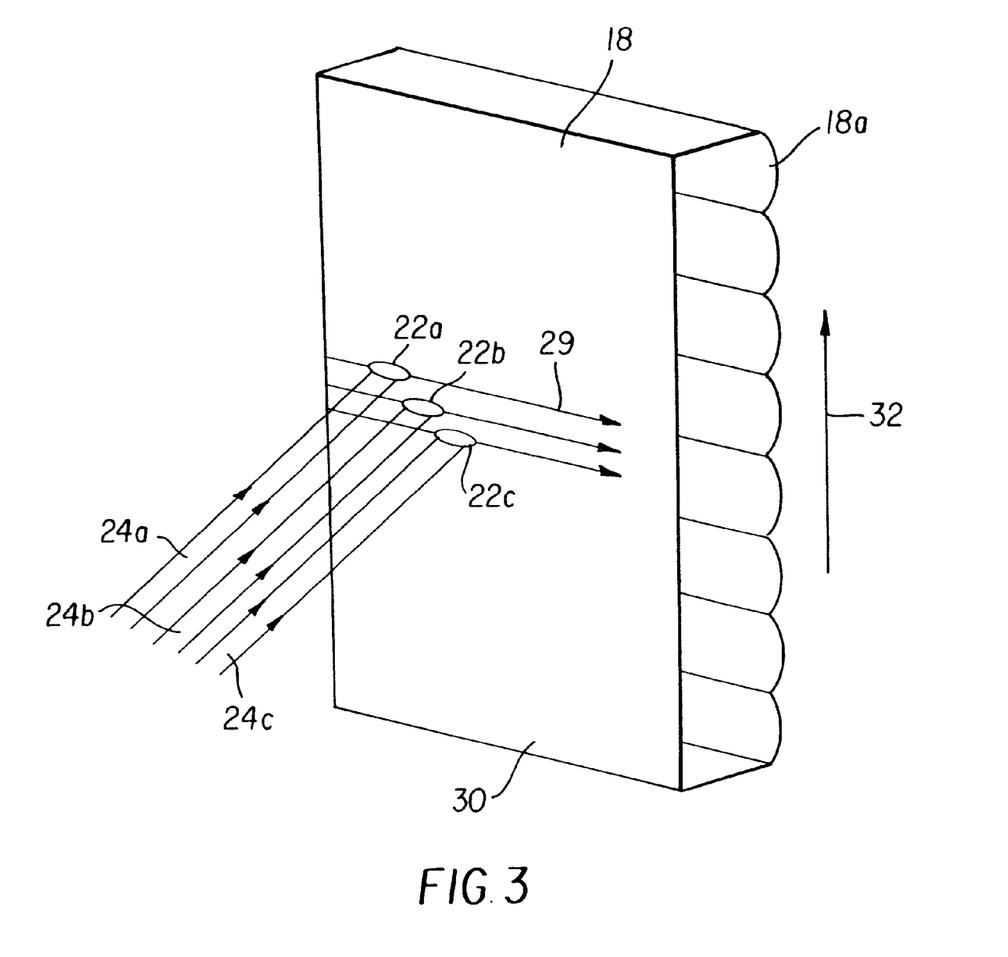
FIG. 3 shows the orientation of scanning spots on a lenticular sheet.
Figure 4:
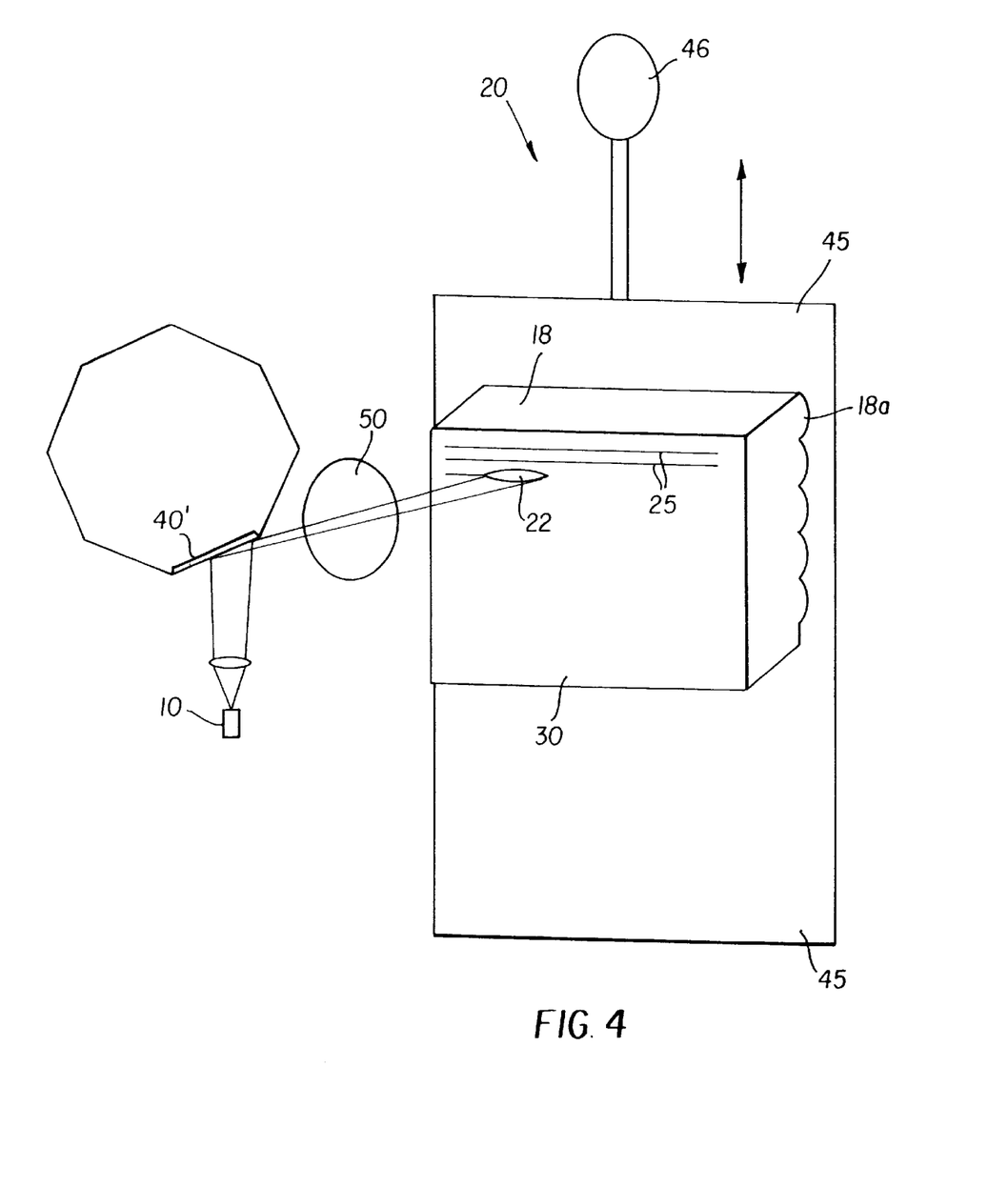
FIG. 4 is a perspective schematic view of a printer showing a stage for translating the lenticular sheet (and a thermal donor if a thermal dye transfer method is used) in a cross scan direction.

The recording material 30 is advanced, as shown by a vertical arrow 32 on FIG. 3, in the slow scan (cross scan) direction so narrow line spacings are being made, thereby abutting the image lines. The scanning function may be accomplished by any scanner, for example a galvo-mirror 40 (FIG. 1B), spinning hologon, or a spinning polygon mirror 40' such as the one depicted in FIG. 4. The laser beams 24a, 24b and 24c are focused on the recording material 30 with a scan lens 50, for example, an f-θ lens shown in FIG. 1B. Such a scan lens may be made of refractive and/or reflective component(s).

Figure 5:
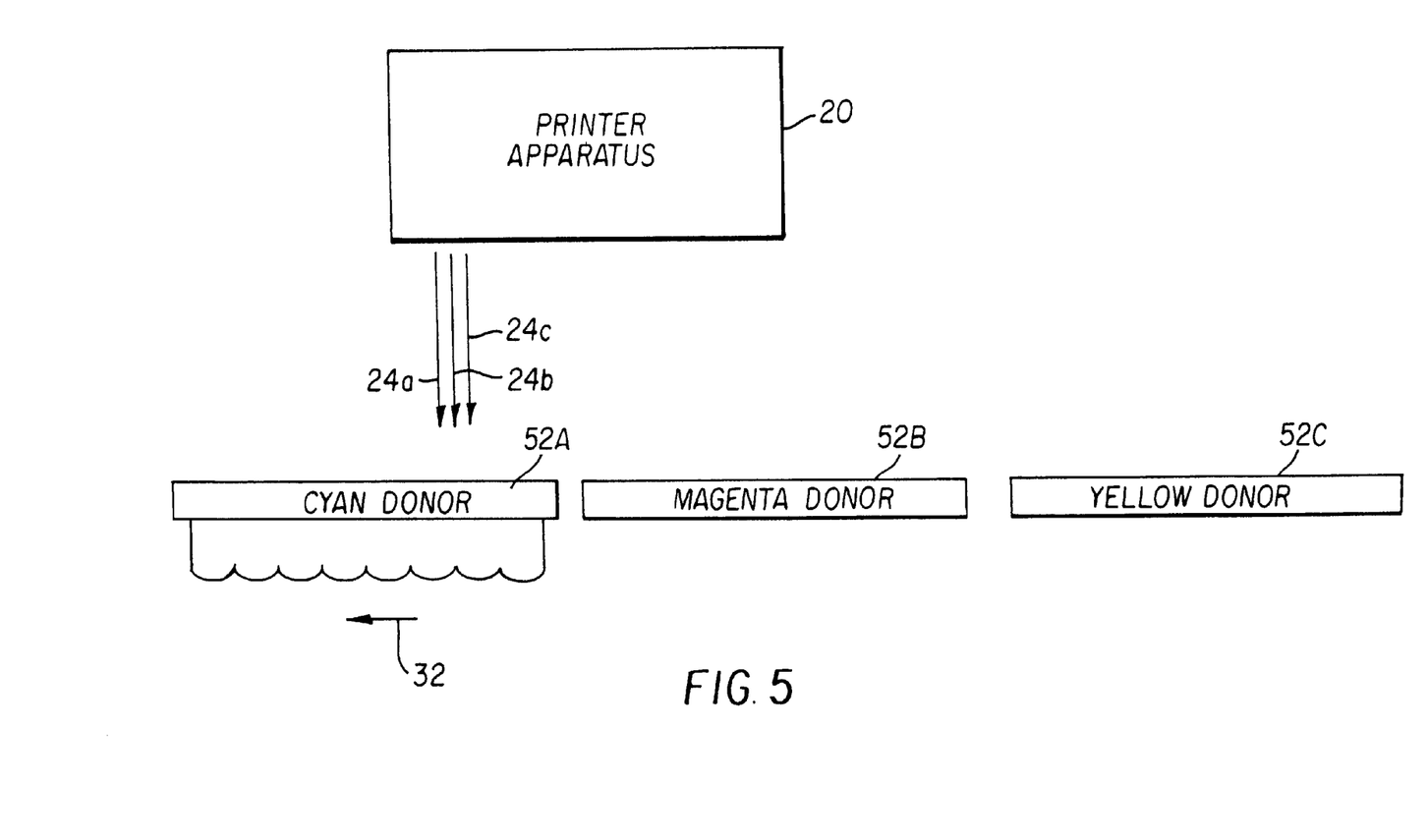
FIG. 5 illustrates a thermal laser printer exposing a thermal donor with three multimode laser beams.

In order to use scanning multimode laser beams 24a, 24b and 24c in conjunction with a thermal dye transfer method, the laser beams are scanned across a thermal donor adhered to the back surface of a lenticular sheet and the scan is conducted in registration with the lenticulas. The stage 45 (see FIG. 4) supporting the recording material 30 is translated by a driver 46 relative to the scanning laser beam 24. If the recording material 30 includes a thermal donor 52A, 52B, 52C, the first thermal donor 52A is removed and the process repeated with two new thermal donors 52B and 52C (of different colors) to achieve a full color image. This is shown in FIG. 5.

Figure 6A:
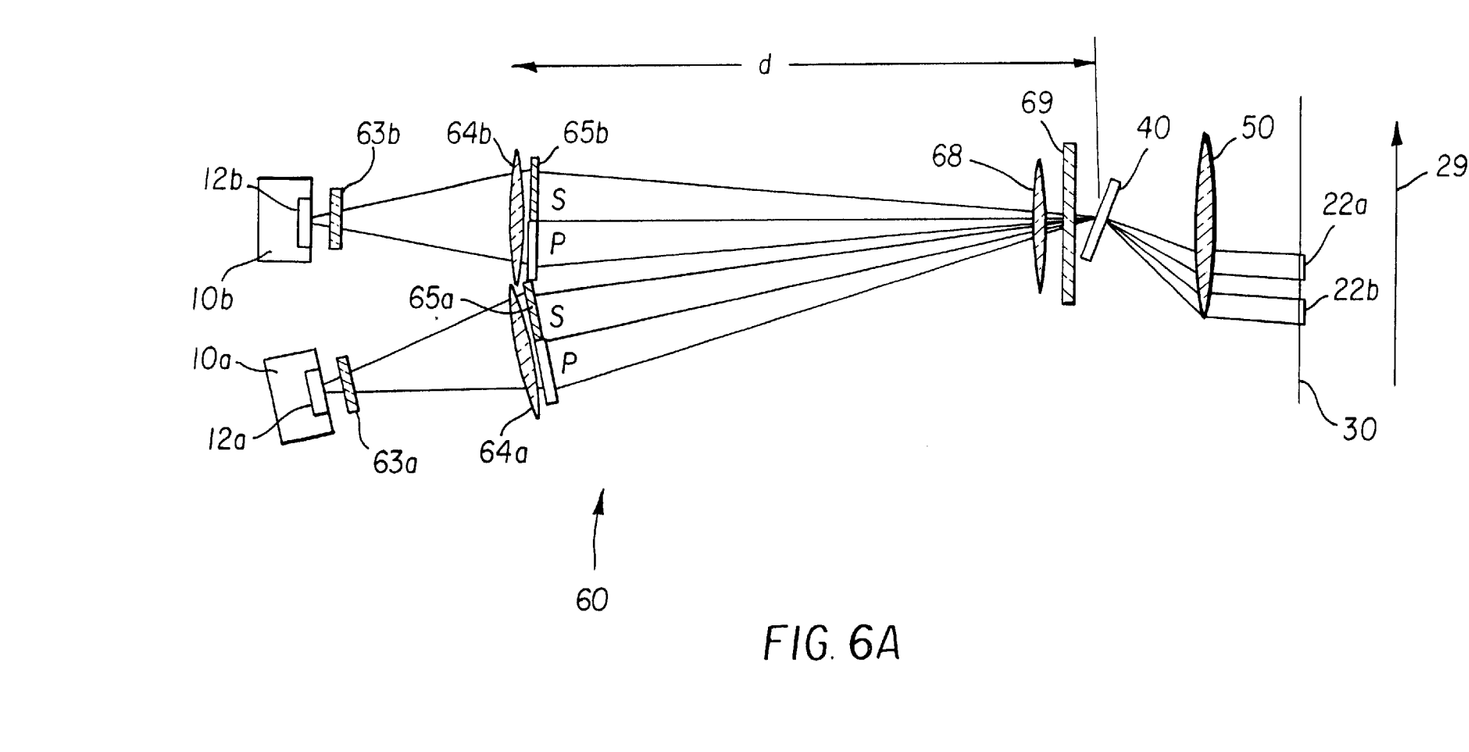
FIG. 6A is a cross sectional view of the first embodiment in the scan direction.

As described above, laser beams 24a, 24b and 24c from the multimode lasers 10a, 10b and 10c are diverging at large angles in a direction corresponding to a small dimension of the emitting apertures. (See FIG. 2A). The imaging system 60 of the printer 20 reduces the divergence of the laser beams in the cross scan direction and provides scanning spots 22a, 22b and 22c at the recording media 30. The imaging system 60 includes optical components 63a, 63b and 63c, collection lenses 64a, 64b and 64c, a field lens 68 and the scan lens 50. These components are depicted in FIGs. 1B and 6A.

The optical components 63a, 63b and 63c are placed close to its corresponding lasers 10a, 10b and 10c. These optical components are cylindrical or toroidal in order to reduce this divergence in the cross scan direction. If cylindrical optical components are used, these components introduce no optical power in the scan direction. If toroidal optical components are being used, they introduce unequal amounts of optical power in the scan and cross scan directions.

Behind the optical components 63a, 63b and 63c are spherical collection lenses 64a, 64b and 64c. The function and specific parameters of these collection lenses 64a, 64b and 64c are disclosed later on in the specification.

According to one aspect of the present invention, a portion of each laser beam 24a, 24b, 24c is modified to be different from the remaining portion. For example, each of the collection lenses 64a, 64b and 64c has one half of its collection aperture covered with retardation waveplates 65a, 65b or 65c. These retardation plates intersect a portion of the laser beam's cross section and retard the wavefront of this portion of the laser beam by ½, 1½, 2½, etc., waves.

Thus, one half of each of the laser beams 24a, 24b, 24c exiting its respective collection lens 64a, 64, 64c is retarded by a ½ wave (or by an equivalent amount) relative to the other half of the laser beam. This means that the two portions of the laser beams have differing polarizations and that polarization directions of these two portions of the laser beams are orthogonal to one another. The three laser beams exiting the collection lenses 64a, 64b and 64c and passing through the waveplates 65a, 65b or 65c are directed to the galvo mirror deflector 40. Before the laser beams 24 reach the galvo mirror they pass through the field lens 68 and a Wollaston prism 69. The Wollaston prism 69 overlaps different portions of each of the laser beams 24a, 24b, 24c, creating narrower, more concentrated laser beams. The more detail description of the function of the field lens 68, the Wollaston prism 69 and the waveplates, 65a, 65b or 65c is provided later on in the specification. After being scanned by the galvo mirror, the scanning beams pass through the scan lens 50 and impinge on the recording material 30.

There are two approaches in constructing an imaging system of a flying spot printer. The first approach requires that the emitting aperture of a laser be optically conjugated by the imaging system to the recording material. This means that the image of the emitting aperture is formed at the recording material. If this approach is used, non-uniformities, hot spots or segmentation of the emitting aperture will affect the scanning spot quality and artifacts may be produced on the print.

In the second approach, the far field of the laser located at the exit pupil of the lens 64a, 64b, and 64c is conjugated to the recording material 30. This is the approach utilized in constructing the imaging system 60, of this embodiment of the present invention, in the direction that corresponds to a scan direction. (See FIG. 6B) In the direction corresponding to the scan direction the exit pupil 64' of the lens 64 is located at the back focal plane of the lens 64. Thus, in this direction the image of the exit pupil 64a', 64b' or 64c' of the collecting lens 64a, 64b, or 64c is formed at the recording material 30, so that the source (emitting aperture) appears infinitely far away to an observer situated at the recording material. This approach is preferred because the spot at the recording material is not the image of the emitting aperture. Therefore, non-uniformities, hot spots or segmentation in the long dimension of the emitting aperture will not result in artifacts and will not effect the quality of the image.

Imaging System Parameters

Figure 6B:
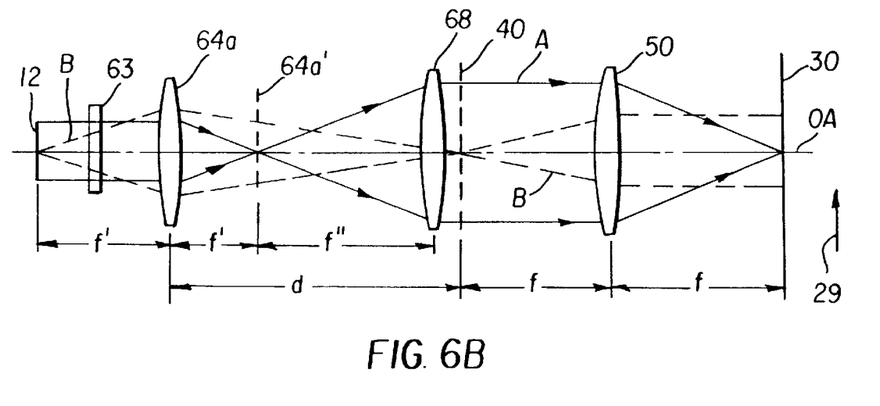
FIG. 6B illustrates an imaging system in the scan direction. This figure does not depict either retardation plates nor a Wollaston prism.
Figure 6C:
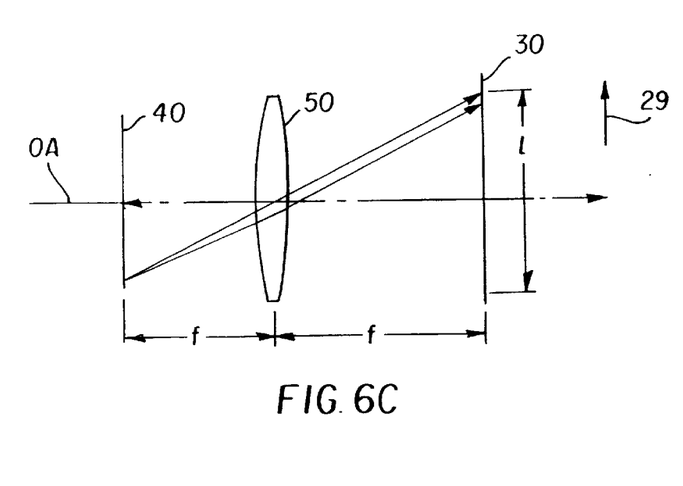
FIG. 6C illustrates how the length of a scan line affects the size of a galvo-mirror.

FIG. 6B illustrates that the scan lens 50 is positioned so as to focus collimated rays A (exiting the field lens 68) on the recording material 30 and to collimate the rays B crossing the optical axis OA at the intermediate image plane, i.e., galvo mirror 40. The focal length requirements of the scan lens 50 and the required length 1 of the scan line (see FIG. 6C) at the recording material 30, determine the size of the galvo mirror 40. For example, if the focal length f of the scan lens 50 is 112 mm, and this scan lens is located at a distance of 112 mm away from the recording material and from the galvo-mirror, than the galvo-mirror dimensions are 12 mm by 12 mm. (See FIG. 6C) Since the length of the emitting aperture 12 of the laser 10 is known (it is 0.1 mm) and its image size on the galvo-mirror 40 is also known (it is 12 mm), the magnification m provided by the lenses 64a and 64b is m=−12/0.1=−120. The focal length f' of lens 64a, 64b and this magnification m will determine the distance d between the lens 64a, 64b and the galvo mirror 40. If the lens 64a, 64b has a focal length of 4.6 mm, the distance d is d=−m*f'=120*4.6 mm=552 mm. Thus, lenses 64a, 64b are located 552 mm in front of the galvo mirror 40.

The laser beams 24a, 24b from the multimode lasers 10a, 10b are directed to overlap at the galvo mirror 40. (See FIGs. 1B and 6A) The field lens 68 is situated proximate to the galvo-mirror 40. The focal length f" of the field lens 68 approximately equals to the distance d (i.e., f"≈d≈552 mm). Therefore, in the scan direction, this field lens 68 collimates the light rays going through the centers of the collection lenses 64a, 64b (See rays B, FIG. 6B). The collimated rays enter the scan lens 50 and are focused by the scan lens 50 on the recording media material plane 30. Thus, in the scan direction, the recording material 30 is conjugated to the exit pupils 64a', 64b', and 64c' of the collection lenses 64a, 64b, and the spots 22a, 22b at the recording material 30 correspond to the beam profiles at the exit pupils 64a', 64b' of lens 64a, 64b. This is illustrated in FIG. 6B, which schematically depicts the imaging system (without the Wollaston prism or the retardation plates). It is noted that, for simplicity sake, FIG. 6B illustrates only one of the plurality of multimode lasers and its corresponding optics and, shows the formation of only one spot on the recording material.

Figures 6D, 6E:
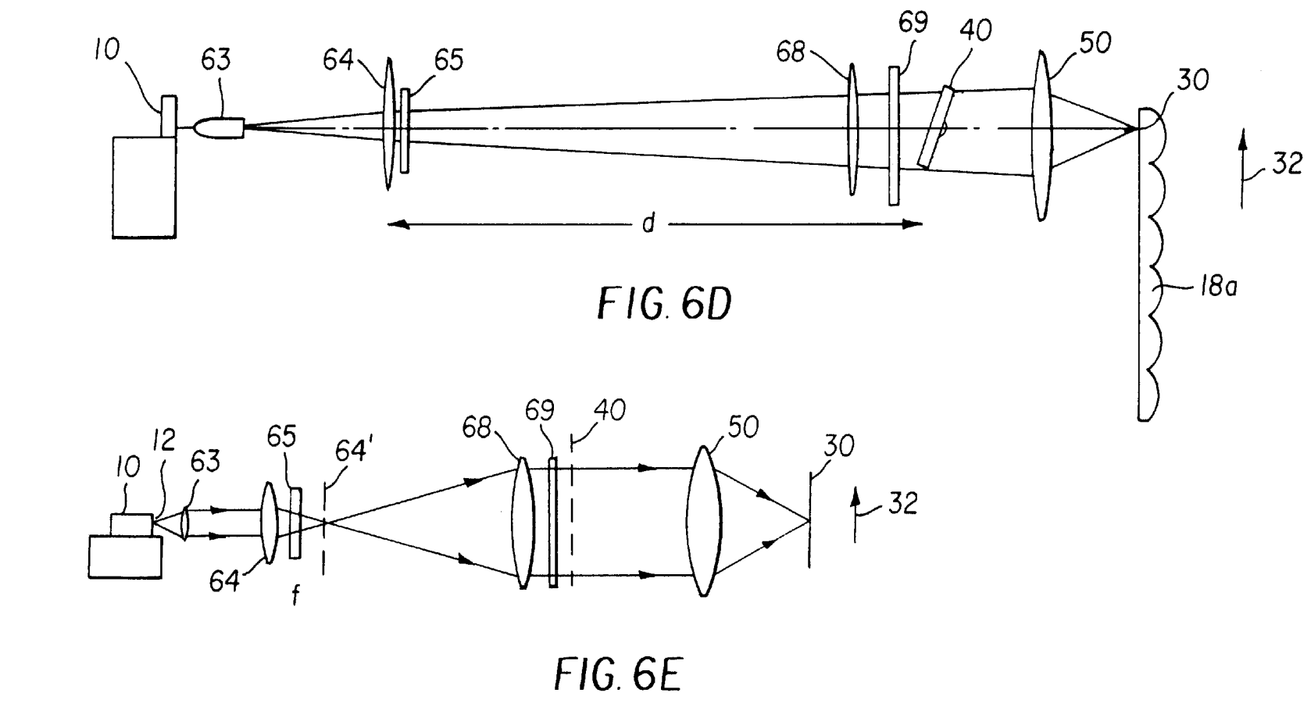
FIG. 6D is a schematic cross sectional view of the first embodiment in the cross scan direction, showing gaussian beam propagation.
FIG. 6E is a schematic cross sectional view of the first embodiment in the cross scan direction. This figure shows that an image of the emitting aperture is formed at the recording medium in the cross scan direction.

FIG. 6D shows another schematic cross sectional view of the printer according to the first embodiment of the present invention. This view depicts the printer in a cross scan direction and shows that the recording medium is conjugated to the emitting apertures in the cross scan direction.

It is noted that we are conjugating the emitting aperture to the medium in the geometrical optics sense. (See FIG. 6E). However, gaussian beam properties apply because we are using laser beams.

Figure 6F:
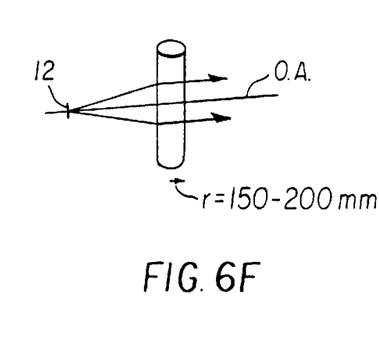
FIG. 6F illustrates a fiber optics segment that is used to reduce beam divergence.

In the direction corresponding to a cross scan direction the laser 10 (only one shown) is essentially a single mode laser. As shown in FIG. 2A, in this direction the laser beam 24 is diverging at a large angle. An anamorphic optical system, such as a cylinder or toroidal optical component 63 is placed close to the laser 10 in order to reduce this divergence. The optical component 63 can be a fiber optics segment (see FIG. 6F) used as a cylinder lens, or a gradient fiber such as the one made by Doric Inc. of Ancienne-Lorette, PQ Canada, or by Blue Sky Research of Santa Cruz, Calif. The focal length of this optical component 63 determines the beam size at the galvo mirror 40. The shorter it is, the smaller is the beam size (in this direction) at the exit pupil of collection lens 64 and thus the bigger is the beam size at the galvo-mirror. It is noted that in the cross scan direction the collection lens component 64 does not create the image the emitting aperture at the plane of the galvo-mirror. Instead the scan lens 50 forms an image of the emitting aperture at the recording material. Thus, in the cross scan direction the emitting aperture and the recording media are conjugated.

By proper choice of the focal length for the lens component 64 it is possible to match the beam size at the galvo mirror 40 to the size of the galvo-mirror. That is, the beam size at the galvo-mirror 40 and the size of the galvo-mirror should be preferably equal or approximately equal to one another. The beam size at the galvo-mirror 40 in this direction is inversely proportional the size of the spot 22 at the recording material 30. Thus a large beam at the galvo is desired. However, too large a beam will be truncated by the galvo-mirror.

For example, the lens component 64 may have the focal length of 110 microns. The cross scan beam size of the laser beam 24 at the FWHM of about 65 microns. This laser beam 24 is shaped by lens component 63 in the cross scan direction so that the laser beam's FWHM waist diameter is about 25 microns. This laser beam diverges over the distance d=552 mm to the galvo of 552 and has FWHM size there of 7.7 mm. The loss at the galvo-mirror due to truncation is about 7.2%. The spot size at the recording material 30, as the laser beam is diffracted by the scan lens 50, is about 14 microns FWHM.

Figure 6G:
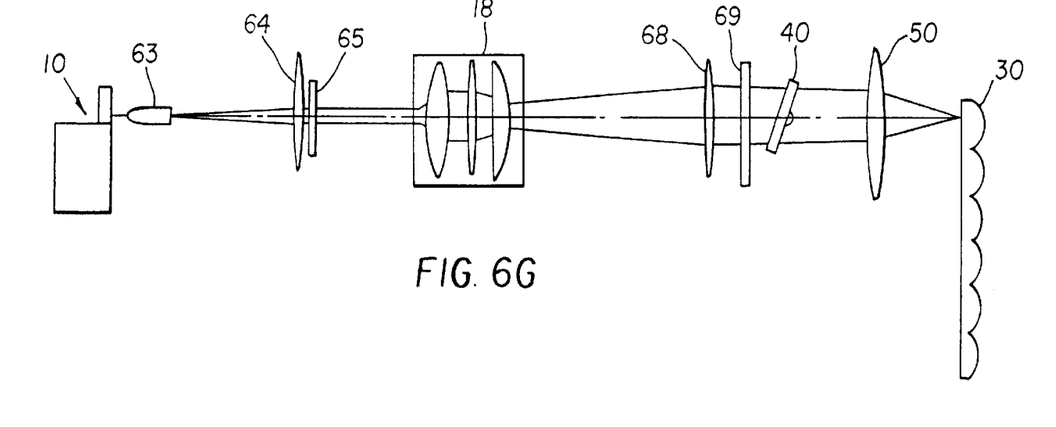
FIG. 6G is a schematic cross sectional view of the second embodiment in the cross scan direction.

Thus, with one cylinder lens 63 (for each of the laser beams), the control of the beam size in the cross scan direction is accomplished. The size of the beams 24a, 24b at the galvo mirror 40 is matched by the cylinder lens 63 to the size of the galvo mirror, so that these sizes are approximately the same (i.e., no more than 15% and preferably 10% or smaller difference). This solution assumes that the deviations in the emitting aperture size in the cross scan beam direction are small. This is not always true and some means for compensation of these variations maybe needed. Lasers from the same production batch may have similar but larger then typical divergence angle in the cross scan direction. This can be remedied by employing additional lenses. For example, FIG. 6G shows one or more movable cylindrical lens elements 66 are placed in the optical path between lenses 64a, 64b and field lens 68 to act as a zoom system and to control the beam size of the laser beam in the cross scan direction.

Reduction of Spot Size and Redistribution of Intensity in the Scan Direction

Figure 7A:
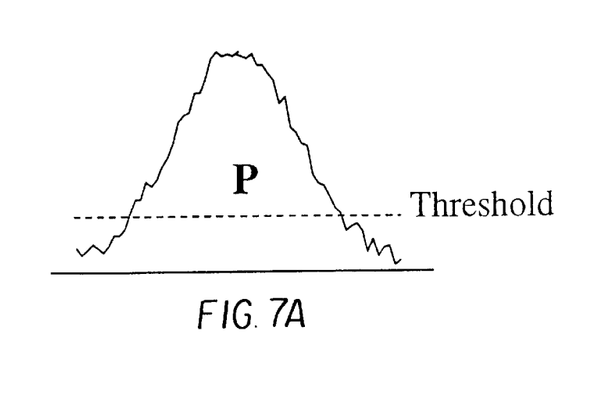
FIG. 7A shows a beam intensity distribution at an exit pupil of the collecting lens, in the scan direction, when no polarization means are being used to shape the beam.

Without the retardation plates 65a, 65b, 65c and the Wollaston prism 69 the energy distribution is the scan direction 29 is approximately Gaussian, as shown in FIG. 7A. In order for efficient dye transfer to occur, a scanning spot with a high density, fairly uniform energy distribution is needed. Thus, a flat top energy distribution is preferred and, the spot size should be of the smallest dimension possible.

According to one aspect of the invention, the shapes of the scanning spots are modified by polarizing optics, such as (½ wave) retardation plates and the Wollaston prism 69, so that the intensity distribution is approximately rectangular in shape and, the size of scanning spots is reduced. FIG. 6A illustrates the cross sectional view of the imaging system 60 of the flying spot printer in the plane parallel to the scan direction. Although more than two multimode lasers may be used this figure depicts only two lasers 10a and 10b. The laser beams 24a, 24b provided by the multimode lasers 10a and 10b are collected by lenses 64a, 64b and imaged onto the galvo mirror 40. The laser beams 24a, 24b are typically polarized, with the polarization in the direction parallel to the long dimension of the emitting aperture, which will be referred to as P polarization.

Figure 7B:
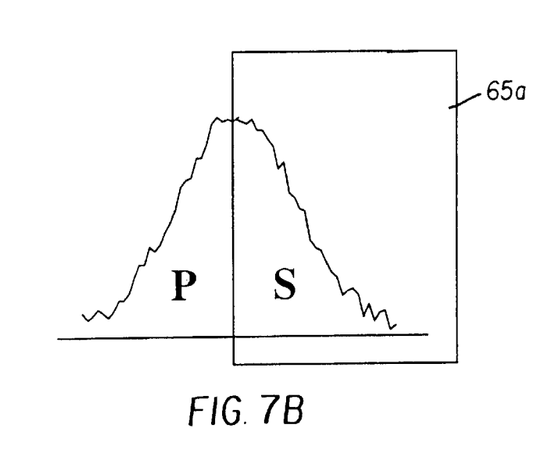
FIG. 7B shows the beam intensity distribution at the exit pupil of the collecting lens, the scan direction, when polarization means are being used to shape the beam.

FIG. 7A shows the P polarized beam entering the exit pupil 64a' or 64b' of lens 64a or 64b. The aperture of each of the lenses 64a, 64b and 64c is half covered with retardation plate 65a and 65b. These retardation plates 65a, 65b change the polarization (of the portion of the beams exiting the retardation plates) from P polarization to S polarization. This is shown on FIG. 7B. Thus, these halves of the laser beams become polarized in the cross scan direction. These polarizations (P and S) are orthogonal to one another.

Figure 7C:
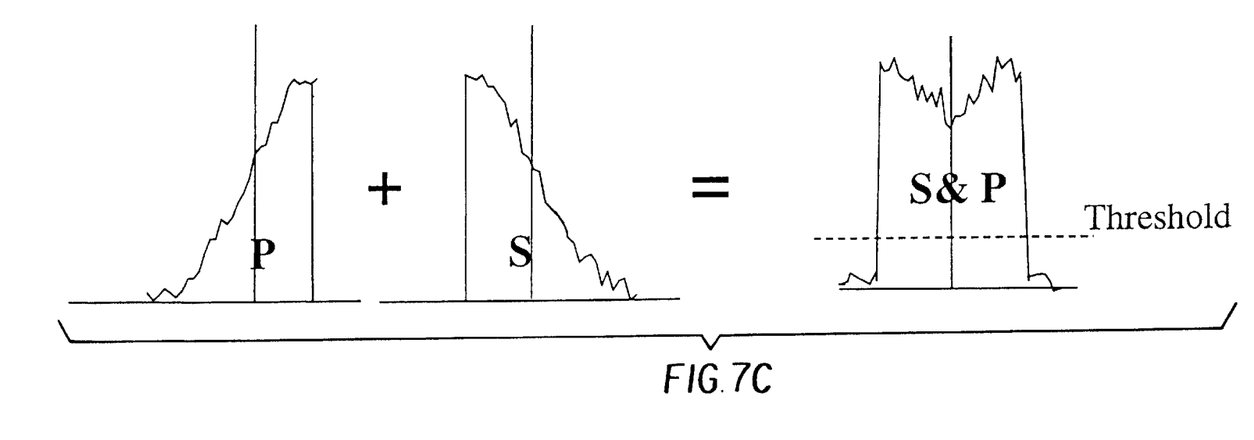
FIG. 7C shows a schematic beam intensity distribution at the recording media, in the scan direction.

The beams 24a, 24b from the multimode lasers 10a, 10b overlap at the galvo-mirror 40. The Wollaston prism 69 is located proximate to the galvo-mirror 40. The Wollaston prism 69 overlaps the S polarized portion of the beam onto the P polarized portion of the beam, creating a concentrated laser beam. The effect of this overlap on the spot shape at the recording material is shown on FIG. 7C. The result is a higher beam density and a more narrow, smoother, approximately rectangular beam intensity profiles. Without the Wollaston prism 69 and the retardation plates 65a, 65b the intensity of the laser beams at the recording material 30 would have been of the shape shown in FIG. 7A. The beam intensity shown on FIG. 7C is better for thermal printing because it is of higher power density as measured in WattS/CM^2. Laser printing typically has a threshold level as shown on FIGS. 7A and 7C. Light under the threshold does not contribute to the printing and is lost. A rectangular energy distribution within the spot minimizes this loss.

The invention has been described in detail with particular reference to certain preferred embodiments thereof, but it will be understood that variations and modifications can be effected within the spirit and scope of the invention. For example, the embodiment shown and described uses a galvanometer or oscillating mirror as the scanning means, however, a rotating polygon could also be used.

PARTS LIST

| | |
|---|---|
| 10a, 10b, 10c | diode laser |
| 12a, 12b, 12c | aperture |
| 12' | small aperture |
| 18 | lenticular sheet |
| 18a | lenticulas |
| 20 | printer apparatus |
| 22a, b, c | spots at the recording media |
| 24a, b, c | laser beams |
| 25 | image lines |
| 29 | scan direction |
| 30 | recording material |
| 32 | cross scan directgion |
| 40 | galvo-mirror |
| 40' | polygon mirror |
| 46 | driver |
| 50 | scan lens |
| 52A, 52B, 52C | thermal donor |
| 60 | imaging system |
| 63a, 63b, 63c | optical component |
| 64a, 64b, 64c | collection lenses |
| 64a', 64b', 64c' | exit pupils of collection lenses |
| 65a, 65b, 65c | retardation waveplates |
| 66 | cylindrical lens elements |
| 68 | field lens |
| 69 | Wollaston prism |

What is claimed is:

1. A method of printing images with a printer that has a scanner and said printer utilizes a polarized multimode laser beam provided by an emitting aperture of a multimode laser, said method comprising the steps of:

changing polarization of a portion of a cross section of said multimode laser beam, so that said multimode laser beam comprises a first portion with one polarization and a second portion with a different polarization;

at least partially superimposing said first portion of said multimode laser beam onto said second portion of said multimode laser beam, thereby forming a superimposed laser beam;

forming a printing spot with said superimposed laser beam;

deflecting said superimposed laser beam along a scan line across a recording material so that a scan direction corresponds to a long dimension of the emitting aperture; and translating the recording material in a direction perpendicular to said scan line.

2. A method according to claim 1 further comprising the step of forming an image of the emitting aperture on a scanner, in at least one cross section.

3. A method for printing images with a printer that has a scanner and said printer utilizes a plurality of polarized multimode laser beams, each of which beams is provided by an emitting aperture of one of a plurality of multimode lasers, said method comprising the steps of:

modulating each of said multimode laser beams;

changing polarization of a portion of a cross section of each of said plurality of multimode laser beams, so that each of said plurality of multimode laser beams comprises a first cross section portion with one polarization and a second cross section portion with a polarization that is different from said one polarization;

directing said plurality of multimode laser beams toward a single beam deflector, such that said plurality of multimode laser beams are at least partially overlapping at said single beam deflector;

at least partially superimposing said first cross section portion onto said second cross section portion, for each of said plurality of multimode laser beams, thereby forming a plurality of superimposed laser beams;

deflecting said plurality of superimposed laser beams across a recording material so that a scan direction corresponds to a long dimension of the emitting apertures; and translating the recording material in a cross scan direction that is perpendicular to said scan direction.

4. A method according to claim 3 wherein each of said multimode laser beams is modulated independently of other multimode laser beams.

5. A method according to claim 3 wherein each of said plurality of multimode beams is collected by a reimaging optics and said emitting aperture is reimaged in at least one cross section on said beam deflector.

6. A method according to claim 3 wherein the step of changing polarization of said portion of said cross section of each of said plurality of said multimode laser beams is done by retardation; and the step of partially superimposing said first cross section portion onto said second cross section portion is done by a prism.

7. A method as in claim 3 further comprising a step of matching a size of each of said plurality of multimode beams, in said cross scan direction, to the deflector size, so that they are approximately the same.

8. A method of printing an image on a lenticular sheet having lenticulas characterized by their length, with a printer that has a scanner and that utilizes a polarized multimode laser beam provided by an emitting aperture of a multimode laser, said method comprising the steps of:

changing polarization of a portion of said multimode laser beam, so that said multimode laser beam comprises a first portion with one polarization and a second portion with a different polarization;

at least partially superimposing said first portion of said multimode laser beam onto said second portion of said multimode laser beam, thereby forming a superimposed laser beam;

forming a printing spot with said superimposed laser beam;

deflecting said superimposed laser beam along a scan line across a lenticular sheet so that a scan direction corresponds to a long dimension of the emitting aperture and is along the length of the lenticulas; and translating the lenticular sheet in a direction perpendicular to the length of the lenticulas by positioning the lenticular sheet on a stage and translating the stage in the direction perpendicular to the length of the lenticulas.

9. An optical apparatus comprising:

a multimode laser adapted to provide a multimode laser beam along a path;

at least one polarization changing component partially intercepting said path to change polarization of laser light intercepted by said component, so that a multimode laser beam provided along said path has a cross section with two portions of differing polarization;

a polarization combiner overlapping said two portions of said multimode laser beam, thereby forming a concentrated laser beam; and a scanner operable to deflect said concentrated laser beam, said scanner being proximate to said polarization combiner.

10. An optical apparatus according to claim 9 wherein said polarization changing component is a retardation plate.

11. An optical apparatus according to claim 9, wherein said polarization combiner is a prism.

12. An optical apparatus according to claim 11, wherein said prism is a Wollaston prism.

13. An optical apparatus according to claim 9 further comprising:

a scanning lens intercepting said concentrated laser beam deflected by said scanner, said scanning lens providing at least one spot at a recording media.

14. An optical apparatus according to claim 13 wherein said scanner is a galvo mirror.

15. An optical apparatus according to claim 13 wherein said scanner is a rotating polygon.

16. An optical apparatus according to claim 13 further comprising an anamorphic lens with an optical power that is stronger in one direction than in a direction perpendicular to said one direction, said anamorphic lens decreasing divergence of said multimode laser beam in at least said one direction.

17. An optical apparatus according to claim 16 wherein said anamorphic lens is a zoom lens.

18. An optical apparatus according to claim 13 wherein said laser has an emitting aperture that has a long cross section and a short cross section, said long cross section corresponding to a scan direction, and said short cross section corresponding to a cross scan direction; and said optical apparatus further includes an imaging optics forming an image of said emitting aperture on said scanner in at least one cross section.

19. An optical apparatus according to claim 18 further comprising an anamorphic lens with an optical power that is stronger in a cross scan direction than in a scan direction, said anamorphic lens decreasing divergence of said multimode laser beam in said cross scan direction.

20. An optical apparatus comprising:

a plurality of individually modulated multimode lasers, each of said multimode lasers having an elongated emitting aperture capable of providing a multimode at least one polarization changing component laser beam along a path;

at least one polarization changing component partially intercepting each of said paths to change polarization of laser light intercepted by said component, so that each of said multimode laser beams provided along said path has two portions of differing polarization;

a scanner operable to deflect incident laser beams;

imaging optics forming an image of said emitting apertures at said scanner, in at least one cross section;

a polarization combiner located proximate to said scanner, said polarization combiner overlapping said two portions of each of said multimode laser beams, thereby forming a plurality of concentrated laser beam.

21. An optical apparatus according to claim 20 wherein said imaging optics includes a plurality of collection lenses, each of said collection lenses corresponding to one of said multimode lasers.

22. An optical apparatus according to claim 20, wherein said polarization combiner is a prism.

23. An optical apparatus according to claim 22, wherein said prism is a Wollaston prism.

24. An optical apparatus as in claim 20 wherein said scanner is a galvo-mirror.

25. An optical apparatus as in claim 20 wherein said scanner is a polygon.

26. An optical apparatus as in claim 20 further comprising at least one anamorphic lens matching the beam size in the cross scan direction to the size of the scanner.

27. An optical apparatus as in claim 26, wherein (i) said imaging optics includes a plurality of collection lenses, each of said collection lenses corresponding to one of said multimode lasers; and (ii) said emitting aperture being optically conjugated to a recording material in a cross-scan direction and an exit pupil of each of said collection lens is being optically conjugated to the recording material in a scan direction.

28. A method for modifying the shape and reducing the size of printing spots of a multimode laser printer that produces at least one polarized multimode laser beam, said method comprising:

changing polarization of a portion of a cross section of said multimode laser beam so that said multimode laser beam comprises a first portion cross section portion with one polarization and a second cross section portion with a different polarization;

at least partially superimposing said first cross section portion of said multimode laser beam onto said second cross section portion of said multimode laser beam, thereby forming a superimposed laser beam;

forming a print spot with said superimposed laser beam; and deflecting said superimposed laser beam a cross a recording material.

29. The method according to claim 28, wherein said polarization of said first cross section portion is in a direction that is orthogonal to a direction of said polarization of said second cross section portion.

30. The method according to claim 28, wherein changing the polarization of said portion of said cross section of said multimode laser beam includes retarding a wavefront of said portion of said cross section of said multimode laser beam.

31. An optical apparatus for a multimode laser printer having a concentrated laser beam with increased power density, the apparatus comprising:

at least one multimode laser operable to provide a multimode laser beam along a path;

at least one polarization changing component positioned at least partially along said path operable to change polarization of said multimode laser beam such that said multimode laser beam h as two portions of differing polarization;

a polarization combiner positioned at least partially along said path operable to overlap said two portions of said multimode laser beam; and a deflector positioned proximate to said polarization combiner operable to deflect said concentrated laser beam.

32. The optical apparatus according to claim 31 wherein said polarization changing component is a retardation plate.

33. The optical apparatus according to claim 31, wherein said polarization combiner is a prism.

34. The optical apparatus according to claim 31, wherein said deflector is one of a galvo mirror and a rotating polygon.

* * * * *